United States Patent [19]
Howard et al.

[11] Patent Number: 4,914,538
[45] Date of Patent: Apr. 3, 1990

[54] MAGNETORESISTIVE READ TRANSDUCER

[75] Inventors: James K. Howard, Morgan Hill; Hung-Chang W. Huang; Cherngye Hwang, both of San Jose, all of Calif.

[73] Assignee: International Business Machines Corporation, Armonk, N.Y.

[21] Appl. No.: 234,250

[22] Filed: Aug. 18, 1988

[51] Int. Cl.⁴ .................. G11B 5/127; G11B 5/33
[52] U.S. Cl. .................................................. 360/113
[58] Field of Search .................. 360/113; 324/252; 338/32 R

[56] References Cited

U.S. PATENT DOCUMENTS

| | | | |
|---|---|---|---|
| 3,967,368 | 7/1976 | Brock et al. | 360/113 |
| 4,503,394 | 5/1985 | Kawakami et al. | 324/252 |
| 4,622,613 | 11/1986 | Nomura et al. | 360/113 |
| 4,663,684 | 5/1987 | Kamo et al. | 360/113 |
| 4,807,073 | 2/1989 | Takeura et al. | 360/113 |

FOREIGN PATENT DOCUMENTS 0067312  6/1977  Japan .................................. 360/113

Primary Examiner—David J. Severin
Attorney, Agent, or Firm—Otto Schmidt, Jr.

[57] ABSTRACT

A magnetoresistive sensor having spaced electrically conductive lead structures comprising a thin film of tungsten having a thin film overlayer, or, alternatively a thin film underlayer and a thin film overlayer, with both the thin film underlayer and the thin film overlayer formed of a material taken from the groups consisting of Ti, Ta, Cr, Zr, Hf, and TiW.

6 Claims, 1 Drawing Sheet

MAGNETORESISTIVE READ TRANSDUCER

BACKGROUND OF THE INVENTION

1. Field of the Invention

This invention relates in general to magnetic transducers for reading information signals from a magnetic medium and, in particular, to an improved magnetoresistive read transducer.

2. Description of the Prior Art

The prior art discloses a magnetic transducer referred to as a magnetoresistive (MR) sensor or head which has been shown to be capable of reading data from a magnetic surface at great linear densities. An MR sensor detects magnetic field signals through the resistance changes of a read element made from a magnetoresistive material as a function of the amount and direction of magnetic flux being sensed by the element.

In the past, principal problems with the MR sensors of unstable operating characteristics have limited their use. One of the sources of unstable operating characteristics has been the conductive lead structures by which resistance variations of the MR film have been sensed. The conductive lead structures have comprised the well-known low resistivity materials which are good electrical conductors. For example U.S. Pat. No. 4,622,613 to Nomura et al describes an MR sensor in which the conductive lead structures are formed of copper, gold, and silver. U.S. Pat. No. 4,663,684 to Kamo et al describes an MR senor in which the conductive lead structures are formed of gold or aluminum. U.S. Pat. No. 4,503,394 discloses an MR sensor in which the conductive lead structures are formed of a two layer assembly in which the first layer is made from a material selected from the group consisting of Cr, Mo, and Ti and the second layer is made from a material selected from the group consisting of Al, Au, Pt and Pd.

The problems that have arisen in MR sensors using the prior art conductive lead structures include high stress, poor adhesion and etchant penetration in subsequent sensor processing which leads to damage and/or degradation to the MR sensors. In addition, problems of interdiffusion and electromigration have caused changes in the electrical characteristics of the sensor during the service life of the MR sensors. A further problem relates to physical changes in the MR sensor due to extrusion and scratching damage at the part of the MR sensor which extends to the air bearing surface.

The prior art has not shown an MR sensor having conductive lead structures which are stable not only in subsequent processing of the MR sensor during manufacture but also are stable over the anticipated useful life of the MR sensor.

SUMMARY OF THE INVENTION

It is therefore the principal object of this invention to provide conductive lead structures for a magnetoresistive sensor which have suitable characteristics which remain stable over the useful life of the sensor.

In accordance with the invention, a magnetoresistive (MR) read transducer assembly comprises a thin film of MR material, and a plurality of electrically conductive lead structures, each of the electrically conductive lead structures electrically contacting the thin film of MR material at spaced positions. The lead structures comprise a thin film of tungsten in contact with the MR material, and either a thin film overlayer or both a thin film overlayer and a thin film underlayer. Both the thin film underlayer and the thin film overlayer are formed of a material taken from the group consisting of titanium, chromium, tantalum, zirconium, hafnium and a titanium-tungsten alloy. When a signal output means is connected between two of the electrically conductive lead structures, the resistance changes in the MR material can be detected as a function of the fields which are intercepted by the thin film of MR material.

The foregoing and other objects, features and advantages of the invention will be apparent from the following more particular description of a preferred embodiment of the invention as illustrated in the accompanying drawings.

DESCRIPTION OF THE PREFERRED EMBODIMENT

Figure 1:
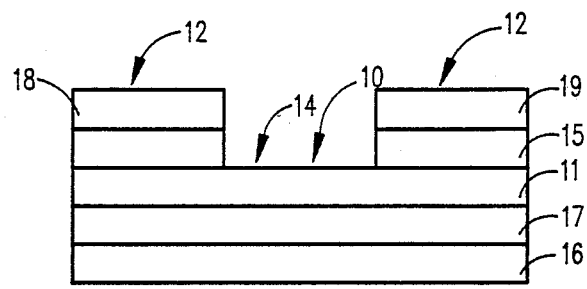
FIG. 1 is an end view of a specific embodiment of an MR read transducer assembly embodying the present invention.

A specific embodiment of a magnetoresistive read transducer assembly will be described briefly in conjunction with FIG. 1. The magnetic read head utilizes a magnetoresistive (MR) sensor 10 produced on a suitable substrate (not shown), and the MR sensor can be divided into two regions, the central active region 14, where actual sensing of data is accomplished, and end regions 12. The two regions 12, 14 should be biased in different manners with longitudinal bias only in the end regions 12 and transverse bias in the active region 14. The longitudinal bias is produced by antiferromagnetic exchange bias layer 15 which is deposited to be in direct physical contact with MR layer 11. The transverse bias is produced by soft magnetic film layer 16 which is separated from the MR layer 11 by a thin nonmagnetic spacer layer 17 whose purpose is to prevent, within the active central region, a magnetic exchange coupling between the MR layer and the soft magnetic bias film layer 16. The distance between the inner edges of conductive lead structures 18 and 19 comprise the part of the active region 14 over which the output signal is sensed.

Figure 2:
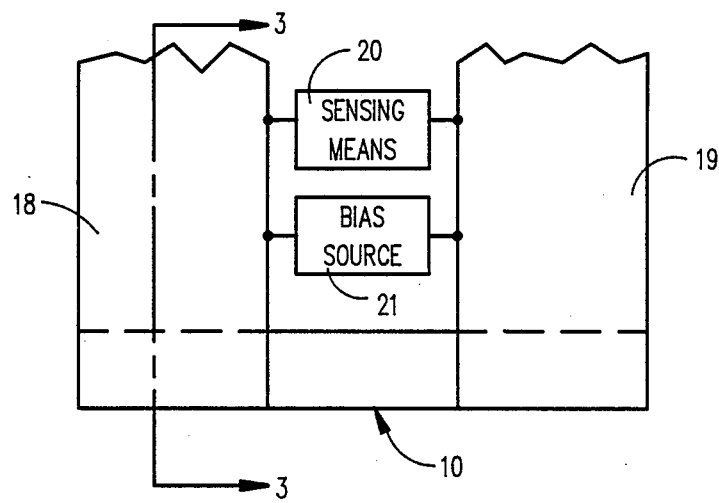
FIG. 2 is a plan view of the transducer shown in FIG. 1.

With reference to FIG. 2, an output signal $i_s$, can be coupled out to sensing means 20, with the aid of conductive lead structures 18 and 19 which are electrically connected to the MR sensor 10. The signal $i_s$ enables the sensing means 20 to determine the resistance changes in the control region 14 as a function of the fields which are intercepted by the MR sensor 10 from previously recorded data on a magnetic medium, for example. A bias source 21 is also connected to conductive lead structures 18 and 19 to supply a bias current which, in conjunction with soft magnetic bias film layer 16, produces the transverse bias in the active region 14 as is known in the art.

According to the present invention, the principal current carrying member of the conductive lead structures 18 and 19 is tungsten (W). However, it has been found that tungsten alone does not produce a reliable conductive lead structure in thin film form, so a structure is provided for conductive lead structures 18 and 19 which comprises a thin film of tungsten with a thin film overlayer formed of a material taken from the group consisting of titanium (Ti), Chromium (Cr), tantalum (Ta), zirconium (Zr), hafnium (Hf), and a titanium-tungsten alloy (TiW). Alternatively, the structure comprises a thin film of tungsten with both a thin film underlayer and a thin film overlayer, with both the underlayer and overlayer formed of a material taken from the group consisting of Ti, Cr, Ta, Zr, Hf and TiW.

Tungsten was chosen as the conductive material for the lead structures 18 and 19 since it has excellent hardness so as to provide protection against mechanical damage such as scratching and smearing, and has little tendency to interdiffuse into adjacent layers. Tungsten also has excellent electromigration lifetime and a resistivity in bulk form about 5.5 $\mu\Omega$cm. Even though this resistivity is higher than conventional conductor lead materials such as gold, it is low enough to be used without extensive redesign of existing circuits for sensing the read signal rom a MR sensor.

Despite the above-mentioned advantageous characteristics, it was found that tungsten is difficult to fabricate in thin film form, with the resulting resistivity being dependent to some extent on the method of fabrication of the tungsten films.

It was discovered that thin films having a resistivity p within the range of 12–20 $\mu\Omega$-cm can be fabricated, and resistivities within this range are still viable candidates to replace the conventional lead structures. However, it was found that these thin films of tungsten alone exhibited the properties of a porous film, poor adhesion, and high stress. As a result of these properties, during subsequent processing of the MR sensor, rupture and delamination of the tungsten films occurred. It is believed that this structural damage results from etchant penetration through the porous tungsten film which results in attack of the underlying structure and leads to the delamination of the tungsten films.

Figure 3:
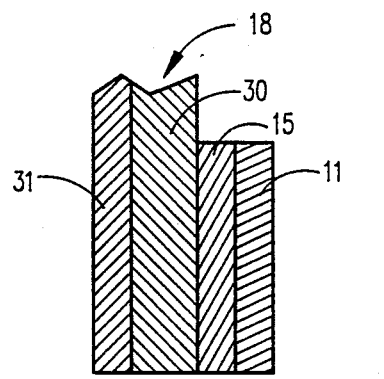
FIG. 3 is a partial section view taken along lines 3—3 of FIG. 1.

A specific embodiment of the present invention is shown in FIG. 3 in which conductive lead structures 18 and 19 comprise a thin film 30 of tungsten preferably having a thickness within the range of 1000–5000 angstroms. The tungsten film 30 is covered with an overlayer 31, preferably having a thickness within the range of 25–200 angstroms, and the overlayer 31 is formed of a material taken from the group consisting of Ti, Cr, Ta, Zr, Hf and TiW. Any remaining bias layers are not shown in FIG. 3, but these layers would usually have the same outline as the MR layer 11 since these layers are normally patterned in the same processing step.

Figure 4:
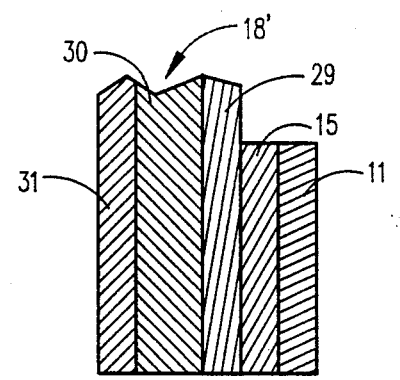
FIG. 4 is a partial section view of an alternate embodiment of an MR read transducer assembly according to tee present invention.

An alternate embodiment of the conductive lead structures is shown in FIG. 4. In this embodiment the lead structure 18' comprises an underlayer 29 with a thickness preferably within the range of 25–200 angstroms. A thin film of tungsten 30 is formed on underlayer 29 and the tungsten film 30 has a thickness within the range of 1000–5000 angstroms. The tungsten film is covered with an overlayer 31 having a thickness within the range of 25–200 angstroms. Both underlayer 29 and overlayer 31 are formed of a material taken from the group consisting of Ti, Cr, Ta, Zr, Hf and TiW.

Specific examples of experimental data for different electrical lead structures for an MR sensor are shown in Tables I and II.

TABLE I

| PROCESS CONDITION | LEAD CONFIGURATION | CHARACTERISTICS |
|---|---|---|
| Target Bias: 700–900 V Substrate Bias: 15–50 V AR Pressure: 20 mTorr | Single Layer W | $\rho$ = 12–20 $\mu\Omega$-cm $\alpha$(BCC) phase |
| Target Bias: 700–900 V Substrate Bias: 0 AR Pressure: 20 m Torr | Single Layer W | $\rho$ = 200 $\mu\Omega$-cm $\beta$(A15) phase |

The examples of lead structures included in Table I comprise leads having a single thin film layer of tungsten. Although a resistivity within an acceptable range could be achieved as illustrated by the first entry in Table I, other characteristics of this lead structure made it unsuitable to meet the requirements of a specific design application. One of the major problems was due to a lack of adhesion of the lead structure which was believed to be due to the porous nature of the tungsten film and due to high stresses in the film. The high resistivity films possess loosely stacked small grain metastable $\beta$ phase, while the low resistivity films show large grain BCC $\alpha$ phase.

The examples of lead structures shown in both Table I and Table II were produced with RF diode sputtered films.

TABLE II

| PROCESS CONDITION | LEAD CONFIGURATION | CHARACTERISTICS |
|---|---|---|
| Target Bias: −700 V Substrate Bias: −30 V AR Pressure: 20 m Torr | 2 Layer W—Ti | $\rho$ = 17–19 $\mu\Omega$cm Stress: 7 × 10$^8$ dyne/cm$^2$ |
| Target Bias: −830 V Substrate Bias: −25 V AR Pressure: 20 m Torr | 3 Layer Ti—W—Ti | $\rho$ = 25–30 $\mu\Omega$cm Stress: 7 × 10$^8$ dyne/cm$^2$ |
| Target Bias: −700 V Substrate Bias: 0 AR Pressure: 20 m Torr | 2 Layer W—Cr | $\rho$ = 26–30 $\mu\Omega$cm Stress: 1 × 10$^9$ dyne/cm$^2$ |

These results show that both 2 layer and 3 layer W-Ti structures can be produced having a resistivity within the desired range. These films also had other characteristics which made them suitable to meet the requirements of a specific design application. The results also show that the 2 layer W-Cr structures have resistivities within the range suitable for many applications. The other characteristics of the two layer W-Cr structures were suitable for specific design applications. Three layer Cr-W-Cr lead structure can also be fabricated with similar characteristics which are also suitable for the specific design applications.

Suitable lead structures were also produced with magnetron sputtered films. The measured characteristics of these structures show that both 2 layer and 3 layer W-Ta structures can be produced, without substrate bias, having a resistivity within the range of about 18–22 $\mu\Omega$ cm. These lead structures also had stress and other characteristics which made them suitable to meet the requirements of a specific design application. The 2 layer and 3 layer W-Ti structures produced with magnetron sputtered films also had resistivity and other characteristics which made them suitable to meet the requirements of a specific design application.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new, and desire to secure by Letters Patent is:

1. A magnetoresistive sensor comprising;
a thin film of magnetoresistive material;
a plurality of electrically conductive lead structures, each of said electrically conductive lead structures electrically contacting said thin film of magnetoresistive material at spaced positions, said electrically conductive lead structures comprising a thin film of tungsten in contact with said thin film of magnetoresistive material and a thin film overlayer formed of a material taken from the group consisting of titanium, chromium, tantalum, zirconium, hafnium and a titanium-tungsten alloy, said thin film of tungsten and said overlayer being coextensive in said lead structures, whereby, when a signal output means is connected between two of said electrically conductive lead structures, the resistance changes in said magnetoresistive material can be detected as a function of the fields which are intercepted by said thin film of magnetoresistive material.

2. The magnetoresistive sensor of claim 1 wherein said thin film overlayer is formed of a material taken from the group consisting of tantalum and titanium.

3. The magnetoresistive sensor of claim 2 wherein said thin film of tungsten is 1000–5000 angstroms thick and said thin film overlayer is 25–200 angstroms thick.

4. A magnetoresistive sensor comprising;
a thin film of magnetoresistive material;
a plurality of electrically conductive lead structures, each of said electrically conductive lead structures electrically contacting said thin film of magnetoresistive material at spaced position, said electrically conductive lead structures comprising a thin film of tungsten, a thin film underlayer in contact with said thin film of magnetoresistive material and a thin film overlayer, both said thin film underlayer and said thin film overlayer being formed of a material taken from the group consisting of titanium, chromium, tantalum, zirconium, hafnium and a titanium-tungsten alloy said thin film of tungsten, said underlayer, and said overlayer being coextensive in said lead structures, whereby, when a signal output means is connected between two of said electrically conductive lead structures, the resistance changes in said magnetoresistive material can be detected as a function of the fields which are intercepted by said thin film of magnetoresistive material.

5. The magnetoresistive sensor of claim 4 wherein said thin film overlayer is formed of a material taken from the group consisting of tantalum and titanium.

6. The magnetoresistive sensor of claim 5 wherein said thin film of tungsten is 1000–5000 angstroms thick and said thin film overlayer is 25–2000 angstroms thick.

* * * * *